Patented June 6, 1944

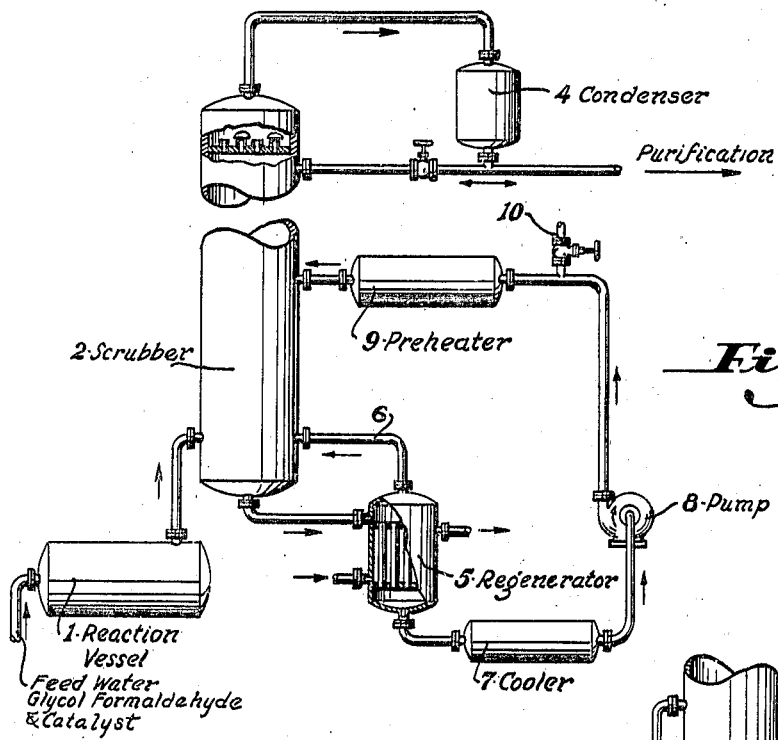
Fig. 1
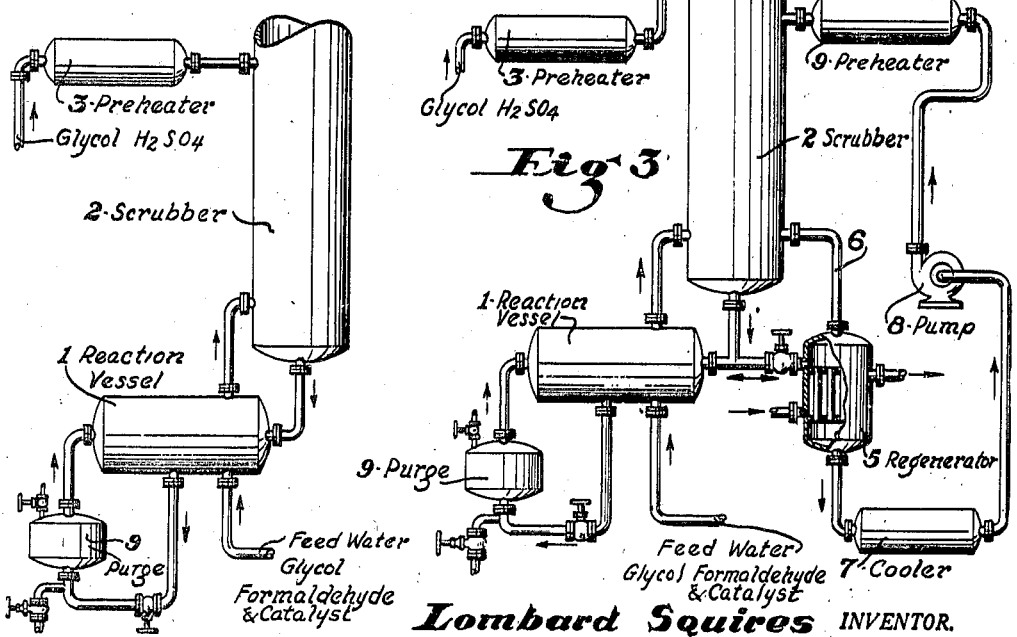
Fig. 2
Fig. 3
Lombard Squires INVENTOR.

2,350,940

UNITED STATES PATENT OFFICE 2,350,940

PREPARATION OF DIOXOLANES

Lombard Squires, Westtown, Pa., assignor to E. I. du Pont de Nemours & Company, Wilmington, Del., a corporation of Delaware Application July 24, 1942, Serial No. 452,249

13 Claims. (Cl. 260—338)

This invention relates to an improved process for the preparation of organic compounds and more particularly to the preparation of dioxolanes from vicinal glycols and formaldehyde.

An object of the present invention is to provide an improved process for the preparation of products from vicinal glycols and formaldehyde wherein loss of formaldehyde is inhibited. Another object is to provide a process for the recovery of formaldehyde from the reaction vapors by scrubbing the vapors with an acidified glycol or substitution product thereof. A further and more specific object is to provide an efficient and economical process for the preparation of 1,3-dioxolane. Other objects and advantages of the invention will hereinafter appear.

In the preparation of dioxolanes and more particularly 1,3-dioxolane from ethylene glycol, formaldehyde, and an acidic catalyst, the 1,3-dioxolane is usually recovered from the reaction mixture by distillation. During the distillation appreciable quantities of formaldehyde distill over with dioxolane and water and must be recovered if the process is to be efficient and economical, and, moreover, the presence of formaldehyde during condensation results in the formation of paraformaldehyde and ultimately in plugs in condensers and other equipment. In accord with this invention, it has been found that if the vapors from the reaction containing, in addition to dioxolane, formaldehyde and water, are contacted (by, for example, scrubbing) with an acidified ethylene glycol, substantially all of the formaldehyde present in the vapors are not only absorbed in this liquid but if the temperature of the liquid is maintained at the reaction temperature of the vicinal glycol-formaldehyde to dioxolane reaction, the dioxolane will also be formed in the scrubber.

The invention can be more readily understood by reference to the attached drawing in the figures of which like parts are designated by like numerals throughout.

Fig. I is a diagrammatic sketch of apparatus in which can be conducted one embodiment of the invention characterized by the regeneration of the scrubbing liquid, the vapors from the regeneration being returned to the bottom of the scrubber and the regenerated liquid being recycled through the scrubber.

Fig. II illustrates an apparatus in which an embodiment of another feature of the invention can be conducted wherein the regeneration of the scrubbing liquid illustrated in Fig. I is replaced by a method of adding acidified glycol to the scrubbing tower and removing the excess catalyst built up by the discharge of a portion of the scrubbing liquid from the primary reaction zones.

Fig. III illustrates another apparatus in which a further and preferred embodiment of the invention can be conducted wherein the features illustrated in Figs. I and II are combined to give a process wherein a portion of the scrubbing liquor is regenerated, and recycled and another portion purged for removing undesired materials which build up in the primary reaction zone.

With reference to Fig. I, the reaction vessel 1, which is designated as the primary reaction zone, is charged with water, glycol, formaldehyde, and an acidic catalyst, the resulting mixture heated and the product which contains water, dioxolane and formaldehyde passed as a vapor into the bottom of the scrubber 2 wherein it contacts a countercurrent flow of glycol and sulfuric acid introduced into the scrubber through preheater 9, the preheater 9 being utilized to bring the temperature of the glycol, sulfuric acid mixture to the approximate operating temperature of the scrubber 2. Within the scrubber and the regenerator 5 the formaldehyde present in the vapors from the reaction vessel 1 are substantially all converted to 1,3-dioxolane, by what is called the secondary reaction. The reaction products which consist of 1,3-dioxolane and a small amount of formaldehyde issue from the top of the scrubber and pass into the condenser 4. From this condenser a portion of the condensed product is sent to purifying units not shown and a sufficient amount refluxed for accurate control of the scrubbing operations. The scrubbing liquid passes from the bottom of the scrubber 2 into the regenerator 5 wherein it is heated by means not shown and the greater portion of the formaldehyde present reacts and distills as 1,3-dioxolane through pipe 6 into the bottom of the scrubber 2. The regenerated scrubbing liquid which comprises essentially glycol plus a small amount of sulfuric acid passes through the cooler 7, pump 8 and preheater 9 back into the top of the scrubbing column 2. The glycol converted to 1,3-dioxolane in the regenerator 5 is made up by glycol added through inlet 10.

Another feature of the process is illustrated by Fig. II which is substantially identical with the main features of the process as illustrated by Fig. I except that no regeneration is provided by this feature and the acidified scrubbing glycol is introduced through preheater 3 into the scrubber 2. The scrubbing liquid in lieu of being passed through a regenerator flows directly to the reaction vessel 1 which, in order to prevent the accumulation of excess catalyst, is provided with a purge cycle wherein a portion of the reaction mixture is passed into the purge vessel 9 wherein it is treated with an alkali to remove the acid catalyst, the resulting salt separated and the thus substantially acid-free product returned to the reaction vessel 1.

The preferred embodiment of the invention illustrated by Fig. III is in effect a combination of the features described in Figs. I and II. In this instance the scrubbing liquid from the base of the scrubber 2 is split two ways, a portion being returned to the reaction vessel 1, another portion passed to the regenerator 5. The liquid in regenerator 5 is returned to the scrubber by the route described above under a discussion of Fig. I while the vapor is returned to the base of the scrubber 2. A portion of make-up glycol necessary to react with the formaldehyde charged to 1 is added, together with a small amount of catalyst, near the top of the scrubber 2 through preheater 3. A portion of the scrubbing liquid passing to reaction vessel 1 eventually builds up a catalyst excess in this vessel which requires the use of a purge as described in the discussion of Fig. II to hold the concentration of catalyst to normal requirements.

The scrubbing of the vapors from the dioxolane reaction with the acidified ethylene glycol is conducted at a temperature ranging between 50 and 150° C. and preferably between 90 and 120° C. It has been found desirable to pass an ethylene glycol containing from 0.5 to 0.01% catalyst through the scrubber, and preferably about 0.05% of an acidic catalyst such as sulfuric acid, the amount of glycol added to the scrubber being preferably equivalent to 0.05 to 0.75 mole per mole of total formaldehyde used and preferably 0.5 mole per mole of formaldehyde on that basis. The reaction in the primary and/or secondary reaction may be conducted under super-, sub-, or atmospheric pressures as desired.

This recovery process is not limited solely to the preparation of 1,3-dioxolane from ethylene glycol and formaldehyde but may likewise be employed for the preparation of the substituted 1,3-dioxolanes which are prepared from formaldehyde and vicinal glycols (that is, glycols which contain hydroxyl groups on adjacent carbon atoms), examples of which are 1,2-propylene glycol; 1,2-butylene glycol; 2,3-butylene glycol; 1,2-amylene glycol; 1,2-hexamethylene glycol, and the like. Reactions of this nature, as is known, are conducted in the presence of acidic type catalysts such, for example, as sulfuric acid, phosphoric acid, hydrochloric acid, stannic chloride, and the like. The invention covered herein, however, is not solely directed to the process per se, but to the scrubbing step and the secondary reaction thereof, which is preferably carried out with the same vicinal glycol and catalyst that is used in the primary reaction to form the corresponding dioxolane, although, of course, it will be appreciated that glycols and catalysts may be used in this step of the process which are dissimilar to those used during the primary reaction. Under such circumstances, however, the reaction taking place during the scrubbing operation would give, in the event that a different vicinal glycol is used, a different dioxolane than is prepared in the primary reaction.

Examples will now be given illustrating embodiments of the invention but it will be understood that the invention will not be limited by the details of the examples. Parts are by weight unless otherwise indicated.

*Example 1.*—This example will be described with reference to Fig. I. In the continuous synthesis of 1,3-dioxolane from ethylene glycol and 60% aqueous formaldehyde, reaction vessel 1 was charged with equal molar weights of ethylene glycol and formaldehyde and throughout the reaction ethylene glycol and formaldehyde were continuously introduced at substantially this weight ratio. An amount of $H_2SO_4$ equal to 0.3% by weight of the contents of the reaction vessel was charged at the beginning of the preparation. The contents of the reaction vessel 1 were maintained between 105 and 115° C. at a pressure slightly in excess of atmospheric and the vapor distilling from this vessel was composed of 65–67 parts of 1,3-dioxolane, 2–3 parts of formaldehyde and 30–33 parts of water.

This vapor was injected into the base of a twenty-five foot scrubber 2 and was passed countercurrent to the flow of a scrubbing liquid composed of ethylene glycol containing from 0.1 to 0.3% sulfuric acid introduced through preheater 9. As the vapor passed through the scrubber 2, free formaldehyde was absorbed by the scrubbing liquor and reacted with the ethylene glycol thereof, so that the vapor leaving the top of the scrubber contained a maximum of 0.25–0.35% free formaldehyde.

The scrubbing liquid was introduced at the rate of 10–20 parts thereof per part of the free formaldehyde in the vapor and discharged from the base of the scrubber to the regenerator 5. While the reaction of formaldehyde with ethylene glycol is rapid, insufficient contact time is obtained in the scrubber 2 for equilibrium conversion of absorbed formaldehyde to 1,3-dioxolane. The liquor discharged from the bottom of the scrubber 2, therefore, was injected into the regenerator 5 where it was heated to 130° C. for a period of from 15 to 30 minutes average contact time. The vapors from the regenerator 5 were returned to the scrubber 2 with the aforementioned reaction vapor. The scrubbing liquor composed of from 0.25 to 0.35 part of free formaldehyde, 0.1–0.3 part of sulfuric acid, 10–12 parts of water, and 87–89 parts of ethylene glycol was passed through the cooler 7, pump 8, and preheater 9, back into the scrubber 2. This recycled scrubbing liquor was adjusted to the temperature of the scrubber 100–110° C. in the preheater 9 before injection into the scrubber 2. Sufficient ethylene glycol to compensate for that removed by reaction with free formaldehyde in regenerator 5 was added periodically to the scrubbing liquid through pipe 10.

The scrubbing operations were synchronized with the reaction operations so that for every mole of total ethylene glycol added as make-up to the scrubber 2 and as a reactant to the reaction vessel 1, one mole of formaldehyde was added to the reaction vessel 1. This balance is desirable if a conversion between 99 and 100% of both reactants is desired and continual accumulation of excess ethylene glycol in the reaction vessel is to be avoided.

*Example 2.*—This example will be described with reference to Fig. II. The reaction products from formaldehyde and ethylene glycol obtained in accord with the chemical reaction described in Example 1 were injected directly into the scrubber 2 and countercurrent to the downward flow of ethylene glycol acidified with 0.01 to 0.05% sulfuric acid preheated to a temperature between 100 and 110° C. in preheater 3 prior to introduction. Instead of regenerating the scrubbing liquor, discharged from the base of the scrubber, the liquor was allowed to flow directly into the reaction vessel 1. In this reaction also an equimolar balance was maintained between the total formaldehyde and total ethylene glycol added to both scrubbing liquid and reaction vessel. Since this balance limited the amount of glycol which could be injected to the scrubber 2 to 10 to 5 moles of ethylene glycol per mole of free formaldehyde to be removed from the vapor, the distillate removed from the top of the scrubber contains 0.6% free formaldehyde. In this reaction no paraformaldehyde was formed in condenser or tubes.

Although this method eliminated the necessity of regenerating and recycling scrubbing liquor, it introduced a purge requirement to prevent the accumulation of excess sulfuric acid in the reaction vessel. This purge did not reduce the economy of the process since the purged material could be neutralized and recycled to the reaction. This phase of the process was conducted by bleeding a portion of the reaction mixture from the reaction vessel 1 to the purging vessel 9 wherein the acid catalyst was neutralized with lime, the calcium sulfate separated and the catalyst-free reactants returned to reaction vessel 1.

*Example 3.*—The apparatus that may be used in conducting this example is illustrated by Fig. III. A combination of the procedures described under Examples 1 and 2 is described by this example which illustrates a very efficient method of removing free formaldehyde from reaction vapors generally and especially from 1,3-dioxolane synthesized from ethylene glycol and formaldehyde.

In the operation of this method the scrubbing liquor removed from the base of the scrubber 2 was split into two portions. One portion was regenerated as in Example 1 and recycled to the scrubber 2, entering the middle of the tower after being preheated in preheater 9 to a temperature of 100 to 110° C. The amount of scrubbing liquid regenerated and recycled was approximately equal to 10 to 15 parts per part of free formaldehyde contained in the reaction vapor. Near the top of the scrubber 2 through preheater 3 pure ethylene glycol acidified with 0.05% sulfuric acid was injected as in Example 2.

The reaction vapor entering the bottom of the scrubber 2 first contacts the mixed recycled liquor and acidified ethylene glycol and finally with pure acidified ethylene glycol. By this means, the free formaldehyde in the vapor leaving the top of the scrubber 2 contained a maximum of from 0.02 to 0.10% free formaldehyde, and frequently showed no formaldehyde at all. In this process also no paraformaldehyde was formed.

I claim:

1. In a process for inhibiting the loss of formaldehyde from the vapors of a reaction for the preparation of a dioxolane from a vicinal glycol, formaldehyde, and an acid catalyst, the step which comprises scrubbing the vapors with a vicinal glycol containing the acid catalyst.

2. The process of claim 1 conducted at a temperature above the boiling point of the dioxolane.

3. In a process for inhibiting the loss of formaldehyde from the vapors of a reaction for the preparation of 1,3-dioxolane from ethylene glycol, formaldehyde, and an acid catalyst, the step which comprises scrubbing the vapors with ethylene glycol containing the acid catalyst.

4. The process of claim 3 conducted at a temperature between 50 and 150° C.

5. The process of claim 3 conducted at a temperature above the boiling point of 1,3-dioxolane.

6. In a process for inhibiting the loss of formaldehyde from the vapors of a reaction for the preparation of a dioxolane from a vicinal glycol, formaldehyde, and a sulfuric acid catalyst, the step which comprises scrubbing the vapors resulting from the aforesaid reaction with a scrubbing liquid containing a vicinal glycol and sulfuric acid.

7. In a process for inhibiting the loss of formaldehyde from the vapors of a reaction for the preparation of 1,3-dioxolane from ethylene glycol, formaldehyde, and a sulfuric acid catalyst, the step which comprises scrubbing the vapors from the aforesaid reaction with a scrubbing liquid containing ethylene glycol and sulfuric acid.

8. In a process for inhibiting the loss of formaldehyde from the vapors of a reaction for the preparation of 1,3-dioxolane from ethylene glycol, formaldehyde, and a sulfuric acid catalyst, the step which comprises passing the vapors from the aforesaid reaction into a scrubber and therein scrubbing said vapors with a scrubbing liquid comprising ethylene glycol containing from 0.01 to 0.5% sulfuric acid, the scrubbing liquid being recycled.

9. In a process for inhibiting the loss of formaldehyde from the vapors of a reaction for the preparation of 1,3-dioxolane from ethylene glycol, formaldehyde, and an acidic catalyst, the step which comprises scrubbing the vapors with acidified ethylene glycol containing an acidic catalyst, there being employed as scrubbing liquid from 0.05 to 0.75 mole of ethylene glycol per mole of the total formaldehyde used.

10. In a process for the preparation of a dioxolane from formaldehyde and a vicinal glycol in the presence of an acidic catalyst, the steps which comprise recovering the formaldehyde from the reaction vapors by a scrubbing operation with a glycol scrubbing liquid containing an acidic catalyst, removing the formaldehyde containing scrubbing liquid from the scrubbing operation, converting it to a dioxolane, and returning the substantially formaldehyde-free glycol to the scrubbing operation and scrubbing the said reaction vapors therewith.

11. In a process for the preparation of 1,3-dioxolane from formaldehyde and ethylene glycol in the presence of an acidic catalyst, the steps which comprise recovering the formaldehyde from the reaction vapors by a scrubbing operation with a glycol scrubbing liquid containing an acidic catalyst, removing the formaldehyde containing scrubbing liquid from the scrubbing operation, converting it to 1,3-dioxolane, and returning the substantially formaldehyde-free glycol to the scrubbing operation and scrubbing the said reaction vapors therewith.

12. In a process for the preparation of 1,3-dioxolane, the steps which comprise effecting a primary reaction by reacting formaldehyde with ethylene glycol in the presence of an acidic catalyst, recovering the formaldehyde from the reaction vapors by a scrubbing operation with a glycol scrubbing liquid containing an acidic catalyst, transferring the formaldehyde-containing scrubbing liquid from the scrubbing operation to the primary reaction and subsequently removing a part of the primary reactants, separating the catalyst therefrom, and returning them to the primary reaction.

13. In a process for the preparation of 1,3-dioxolane, the steps which comprise effecting a primary reaction by reacting formaldehyde with ethylene glycol in the presence of an acidic catalyst, recovering the formaldehyde from the reaction vapors by a scrubbing operation with a glycol scrubbing liquid containing an acid catalyst, removing a portion of the formaldehyde-containing scrubbing liquid from the scrubbing operation, converting the formaldehyde therein to 1,3-dioxolane and vaporizing from this portion the 1,3-dioxolane made therein, returning the remaining substantially formaldehyde-free glycol to the scrubbing operation, scrubbing the reaction vapors therewith and passing another portion of the formaldehyde containing scrubbing liquid to the primary reaction, separating the catalyst from a portion of the primary reaction mixture, and returning the catalyst-free composition to the reaction mixture.

LOMBARD SQUIRES.